United States Patent [19]

Keesen et al.

[11] Patent Number: 4,907,101

[45] Date of Patent: Mar. 6, 1990

[54] METHOD AND APPARATUS FOR DIGITAL DATA TRANSMISSION AND/OR RECORDING AND PLAYBACK

[75] Inventors: Heinz-Werner Keesen; Hartmut Peters, both of Hanover, Fed. Rep. of Germany

[73] Assignee: Deutsche Thomson-Brandt GmbH, Villigen-Schwenningen, Fed. Rep. of Germany

[21] Appl. No.: 149,001

[22] Filed: Jan. 27, 1988

[30] Foreign Application Priority Data

Jan. 28, 1987 [DE] Fed. Rep. of Germany ....... 3702490

[51] Int. Cl.⁴ .............................................. G11B 5/09
[52] U.S. Cl. ...................................... 360/48; 360/40
[58] Field of Search ..................... 370/118, 82; 375/31; 360/40, 32, 8, 48

[56] References Cited

U.S. PATENT DOCUMENTS

| | | | |
|---|---|---|---|
| 4,143,242 | 3/1979 | Horiki | 370/118 |
| 4,553,129 | 11/1985 | McNesby et al. | 340/347 |

FOREIGN PATENT DOCUMENTS

| | | |
|---|---|---|
| 2657967 | 6/1978 | Fed. Rep. of Germany . |
| 3510901 | 10/1986 | Fed. Rep. of Germany . |
| 3513074 | 10/1986 | Fed. Rep. of Germany . |

OTHER PUBLICATIONS

DPCM MIT Variable Wortlänge für die Fernsehbildcodierung, Nachrichtentechnik, Elektronic, 31, 1981, H. 4 S. 143.

Codierungstechniken für Einen Digitalen Videorecorder, Rundfunktechnische Mitteilungen, Jg. 28 1984 H. 5, S. 222 Linke Spalte.

*Primary Examiner*—Vincent P. Canney
*Attorney, Agent, or Firm*—Spencer & Frank

[57] ABSTRACT

A method for the transmission and/or recording and playback of digital data wherein the data are converted in sections to digital signals whose word length is a function of the information density of the data sections which reduces the susceptibility of the data to interference. In accordance with the method the digital signals obtained in sections are initially assigned to blocks having a constant word length, whereupon the blocks whose data sections have a smaller word length than the word length given by the blocks are filled with portions of data sections having a word length greater than the word length given by the blocks and finally the data sections are recombined from the blocks in their original word lengths.

18 Claims, 2 Drawing Sheets

METHOD AND APPARATUS FOR DIGITAL DATA TRANSMISSION AND/OR RECORDING AND PLAYBACK

BACKGROUND OF THE INVENTION

The present invention relates to a method of digital data transmission and/or recording and playback wherein the data are converted in sections to digital signals whose word length is a function of the information density of the data sections.

In the transmission and/or recording and playback of signals, the information density is often subject to fluctuations over time This may apply to untreated signals as well as to those treated in a source coder in order to reduce irrelevance and redundancy. Configuration of the transmission path or record carrier, as the case may be, for the maximum information density is complicated and uneconomical. If the transmission and recording capacity is limited to an average information density by way of time compression and subsequent expansion, i.e. with different word lengths for the data sections as a function of the information density, the problem arises of recognizing the different length data sections after transmission or recording. This recognition becomes even more difficult if interference removes the recognition criteria. It may then happen that even after the interference has gone away, it is no longer possible to recognize the subsequent data sections correctly.

SUMMARY OF THE INVENTION

It is an object of the present invention to provide a method for the transmission and/or recording and playback of digital data so that the influence of interference on the detectability of the data sections is substantially reduced.

This is accomplished after converting the data sections to digital signals whose word length is a function of the information density of the data sections, by initially assigning the digital signals obtained in sections to blocks having constant word lengths, filling up the blocks in which the data sections have a shorter word length than the word length given by the blocks with portions of data sections having a greater word length than the word length given by the blocks, and finally, reconstructing the data sections from the blocks in their original word lengths.

The present invention combines the measure of time compression and expansion of the data sections with a fixed time pattern and thus takes care that blocks whose capacity is not exhausted by the assigned data sections are filled with other data sections and are thus utilized more fully. Thus, on the one hand, it is ensured that the data are complete and, on the other hand, the time pattern makes it possible to recognize the data sections by their assignment to the blocks. The influence of interference is thus limited to a change of the immediately succeeding individual data and can no longer have an adverse effect on the subsequent recognition of the data sections per se. This is accomplished by the rigid time pattern of the constant word length blocks.

As a further feature of the invention, a plurality of blocks may be combined into a frame and within this frame, prior to the assigning of data sections to blocks, portions of the data sections are weighted in accordance with their significances in such a way that the sum of the word lengths of the data sections before the blocks are filled up may be brought into coincidence with the sum of the word lengths of the blocks. This may be done, for example, by selecting significant portions of input data sections to be assigned without change to separate regions of the blocks and weighting, i.e. compressing, less significant portions for possible distribution to other blocks, or by quantizing weighting.

A quantizing weighting may be done by controlling the quantizer so that data samples are quantized in different ranges, meaning that the resolution of the sample will be different.

In general, coincidence between the sums of word lengths of blocks and data sections of a frame may be achieved with increases and/or decreases of the original word lengths of the input data sections. The important thing is, however, that after weighting, the sum of the word lengths of the data sections (output data sections) is equal to or less than the sum of the word lengths of the blocks so that the available block word length is utilized in an optimum manner and no important information is lost. Uniform irrelevance reduction or reduction of detail in the information must here not be considered as a loss of significant information. The sum of the word lengths of the data sections should also be considered to coincide with the sum of the word lengths of the blocks if the sum of the word lengths of the data sections is somewhat smaller than the sum of the word lengths of the blocks, i.e. not all blocks are filled with portions of data sections. This will often be the case in practice since precise filling requires a considerable time for coordination and the result would not be in any relationship to the costs involved.

The invention also relates to an apparatus for the transmission and/or recording and playback of digital data wherein a circuit arrangement is employed to convert the data in sections to digital signals whose word length is function of the information density.

In this respect it is an object of the invention to improve an apparatus of the above-mentioned type so that the influence of interference on the recognizability of the data is significantly reduced.

This is accomplished in an apparatus which includes a counter disposed on the source side of a transmission path or of a record carrier, as the case may be, a multiplexer which splits the signal path to a first memory group and to a second memory group, a demultiplexer which combines the memory groups, a decoder disposed on the sink side of the transmission path or record carrier, a second multiplexer connected thereto which splits the signal path to a third memory group and a fourth memory group, a second demultiplexer which combines the third memory group with the fourth memory group and a control circuit on the source side as well as a control circuit on the sink side.

BRIEF DESCRIPTION OF THE DRAWINGS

These and other features and advantages of the invention will be better understood from the following description of the preferred embodiment when considered with the accompanying drawings in which.

DESCRIPTION OF THE PREFERRED EMBODIMENT

Figure 1:
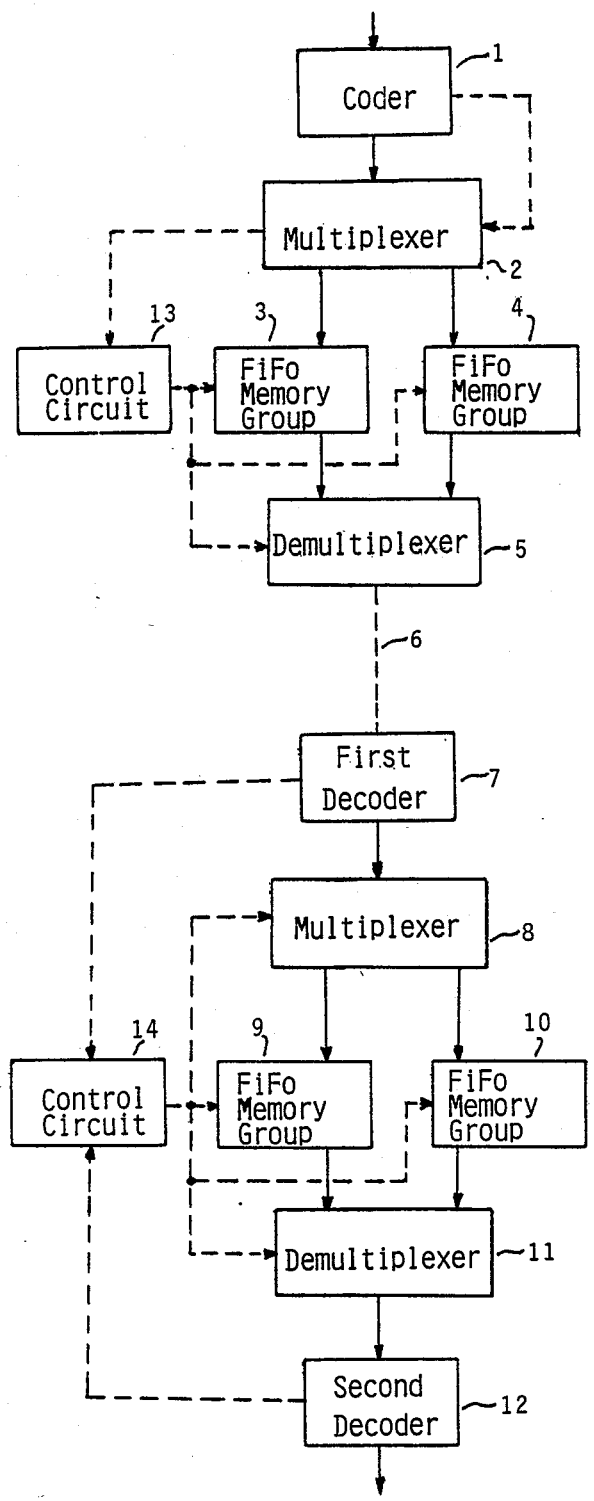
FIG. 1 is a block circuit diagram of the apparatus of the invention.

The block circuit diagram includes, seen in the direction of data flow, a coder 1, a first multiplexer 2, a first F1FO memory group 3 and a second F1F0 memory group 4 which can be switched on alternatively, a first demultiplexer 5, a transmission path or record carrier 6, a first decoder 7, a second multiplexer 8, a third F1F0 memory group 9 and a fourth F1F0 memory group 10 which can be switched on alternatively, a second demultiplexer 11, a second decoder 12, a first control circuit 13 and a second control circuit 14.

The data fed to coder 1 may be, for example, digital video signals which were obtained by conversion in an analog/digital converter. Insofar as certain parts of the image are given here from which the data words are formed, these data have a fixed word length and include a data section end signal, but they have different information densities. In a video signal, the information density has a functional relationship with the fine structure of the image.

Coder 1 is a source coder which reduces the redundant and irrelevant portions of input sections of the fed-in data. This may occur, for example, with the aid of a transforming member whose output signal (in the spectral domain) is a discrete cosine transform which is subsequently weighted and thus insignificant spectral coefficients are separated from significant ones. At the output of coder 1, there then appear output data sections having variable word lengths each data section including a direct component and the maximum spectral coefficient. A data section end signal or a control signal to indicate the magnitude of the data section are also included in each of these data sections.

This data section end signal or alternatively a control signal to indicate the magnitude of the data section are necessary to get an evaluable signal about the length of data sections with variable length. The control signal may for example name the number of bits or the number of coefficients which belong to one section.

By means of the first multiplexer 2 which includes a counter for the number of bits in the word length corresponding to a block, the data of a data section are initially written into the first memory group 3. In this memory group, a number of memory locations corresponding to the word length of a block is reserved for each block. If the memory locations are not all utilized or are barely all utilized, this block remains assigned to memory group 3. Otherwise, where the number of memory locations is exceeded by the word length of the data section, the remainder which exceeds the word length of the block is written into second memory group 4. Then the next data section is assigned to a further block and stored in the same manner.

In a video signal, a data section may be composed, for example, of a square of 8×8 pixels. A coded block of this data section may then take up 64 bits. Advisably all image sections of a total image are combined into one frame and all blocks of a frame are stored in memory group 3 and the data sections whose word lengths exceed the word length of a block are stored in memory group 4. Then the blocks are transferred, beginning with the first block, via demultiplexer 5 to the transmission path or record carrier 6, and in cases in which the existing word length is less than the maximum possible word length, a switch is made to second memory group 4 which is filled u with the excess portions of other data sections. Thus, the result is a sequence of blocks which all or almost all include the maximum possible word length and may contain all portions of a plurality of data sections. However, it may happen that the last couple of blocks can no longer be filled completely with portions of data sections. In this case, empty spaces are inserted. The corresponding control is effected by control circuit 13 which coordinates the time sequences. The circuit may be realized by way of hardware from discrete components as well as by a computer and its internal computer memories.

After transmission or storage, the data boxed in the blocks reach first decoder 7 which evaluates the block for the data section end signal.

The first decoder 7 decodes the incoming data. If within a "physical section," that is a section of constant length as e.g. stored on tape or being transmitted, appears a data section end signals then the data in the physical section up to the data section end signal are written into memory group 9. The rest of data up to the end of the physical section is written into memory group 10.

If no data section end signal appears in the physical section, then the complete physical block is written into memory group 9.

When reading the data out of the memory groups, the data will be read up to a data section end signal. If no data section end signal appears the data will be read up to a fixed number of bits, e.g. 64, and is then appended by the data of the other memory group until a data section end signal is recognized.

The first part of the block is then written by means of second multiplexer 8 into the third memory group 9 until a data section end signal occurs. Then multiplexer 8 switches to fourth memory group 10, into which the remainder is written. Thereafter, the next block is again initially written into third memory group 9. Memory group 9 now again contains blocks which contain only one data section. If this data section has a smaller word length than, or the same word length as, the word length of the blocks, the data section is complete. In this case, the second demultiplexer 11 switches the complete data section to second decoder 12. In the other case, i.e. if the data section present in memory group 9 is not yet complete, it is supplemented by the remaining portions in that, after the end of the incomplete data section, demultiplexer 11 switches from memory group 9 to memory group 10.

At the input of second decoder 12 there are again data sections having variable word lengths. Decoder 12 is the counterpart to decoder 1 so that at its output a data stream appears which corresponds to the data stream at the input of coder 1.

Figure 2:
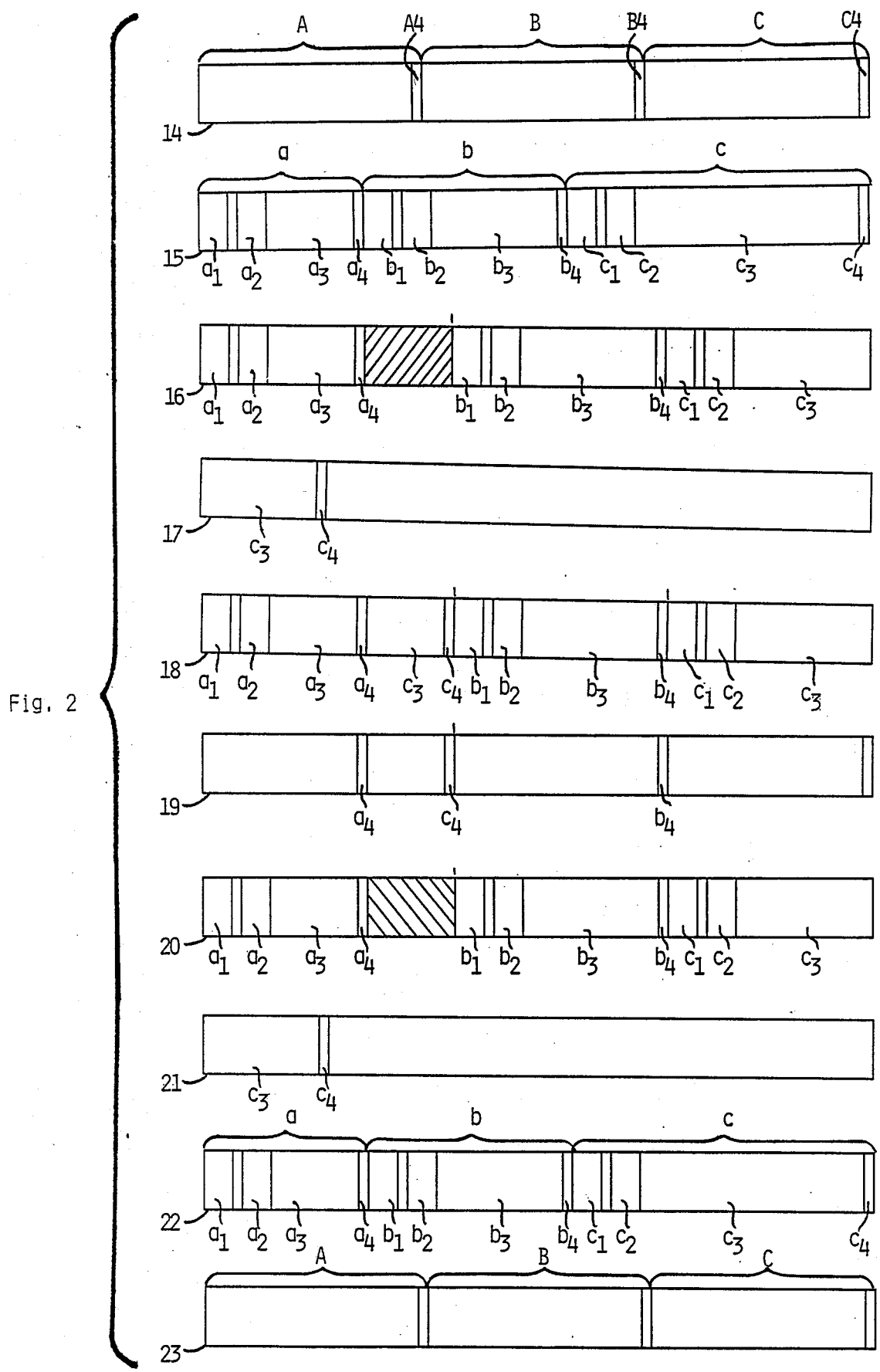
FIG. 2 shows the data flow over time at selected locations in the circuit shown in FIG. 1.

To explain the data flow, reference is now made to FIG. 2. The illustration is here limited to three data sections having different information density. The data sections before coding in coder 1 (input sections) and after decoding in decoder 12 are marked by the capital letters A, B, and C. The graphic representation is shown in fields 14 and 23. The sections of coded signals (output sections) are represented by lower case letters. Depending on the significance of the code, the letters are given indexes. Index 1 represents the direct component, index 2 represents the greatest spectral coefficient, index 3 represents the subordinate spectral coefficients and index 4 represents the end of data section signal. In the illustrated example, the data section end signal is already present to mark the section of uncoded data. In the coded data, the direct component and the most important coefficient as well as possibly a signal specifying the length of the data sections, which is not separately marked with a reference numeral in the drawings, each cover a fixed region and are secured by securing signals against transmission and recording errors. The only thing variable is the word length given by the subordinate coefficients.

As securing signals all types of error correcting are applicable, such as the "cyclic redundancy check" code, "eight to ten code", and "Reed Solomon code". These codes are disclosed in Shu Lin, "An Introduction to Error Correcting Codes". The securing signals are used to secure essential parts of the data which may cause recognizable error.

The information density of the data sections is distributed in such a manner that section A has a low information density, section B has an average information density and section C has a high information density. This is illustrated in field 15 by the different word length of the data sections marked with the index 3. A signal current corresponding to this field appears at the output of coder 1. Field 16 shows the memory locations occupied in memory group 3, and field 17 shows the memory locations occupied in memory group 4. Field 16 indicates that the data sections are assigned to three blocks having the same word lengths. The first block is not fully occupied by data section a, the second block is just filled by data section b, the third block is unable to completely accommodate data section c. The excess portion is therefore present in memory group 4.

Field 18 illustrates the data stream downstream of demultiplexer 5. As can be seen in the drawing figure, the free area in the first block is filled with the remainder of data section c. This data stream can now be transferred and/or stored and read out in the illustrated time sequence. Field 19 shows how the data section end signals are evaluated by the first decoder 7 so as to control multiplexer 8. During the procedure of coding data of one picture, the delay must be so large that e.g. data of one section at the end of the picture are still able to be inserted into one section at the beginning of the picture. In this case the delay must be at minimum the sample time of one picture.

Multiplexer 8 is switched by decoder 7 in such a manner that blocks of the same length are written into memory group 9 as shown in field 20 and excess data section portions are written into memory group 10 as shown in field 21. Field 20 here again corresponds to field 16, while field 21 corresponds to field 17. Thereafter, demultiplexer 11 again assigns the data to data sections of different lengths as shown in field 22. This illustration corresponds to field 15. After passing through the second decoder 12, the output signal shown in field 14 is again obtained in field 23, thus completing the processing of the signals.

The invention now being fully described, it will be apparent to one of ordinary skill in the art that many changes and modifications can be made thereto without departing from the spirit or scope of the invention as set forth herein.

WHAT IS CLAIMED:

1. A method of transmitting and/or recording and playing back digital data, comprising the steps of:
   converting input data in input sections to digital signals in corresponding output sections having word lengths which are a function of information density in the corresponding input sections;
   assigning the output sections of digital signals to blocks having constant word lengths;
   filling the blocks assigned to output sections having word lengths that are less than the constant word lengths of the blocks with portions of the output sections having word lengths which are greater than the constant word lengths of the blocks;
   transmitting the blocks, and
   reconstructing the output sections from the received blocks in their original word lengths.

2. A method as in claim 1, further comprising the step of combining a plurality of the blocks into a frame for transmission and wherein said step of converting includes the step of, within the frame, forming the output sections so as to bring the sum of the word lengths of the output sections into coincidence with the sum of the word lengths of the blocks of the frame before the blocks are filled up.

3. A method as in claim 2, wherein said step of forming the output sections comprises the step of bringing the sum of the word lengths of the output sections into coincidence with the sum of the word lengths of the blocks by weighting the relevance of the information therein.

4. A method as in claim 2, wherein said step of forming the output sections comprises the step of bringing the sum of the word lengths of the output sections into coincidence with the sum of the word lengths of the blocks by quantizing weighting.

5. A method as in claim 2, wherein said step of forming the output sections comprises the steps of selecting significant portions of the input sections and selecting and weighting less significant portions of the input sections, and said step of assigning includes the step of assigning the significant portions without change to separate regions of the blocks.

6. A method as in claim 5, further comprising the step of distributing the less significant portions to other blocks after said step of weighting.

7. A method as in claim 6, further comprising the step of processing digital video signals by a source coder which includes a transforming member which converts digital video signals into the spectral domain, the input data including the transformed digital video signals, the significant portions being formed of a direct component and the maximum spectral coefficient of the digital video signals.

8. A method as in claim 5, wherein the data are digital video signals, further comprising the step of processing the digital video signals by a source coder which includes a transforming member which converts digital video signals into the spectral domain, the significant portions being formed of a direct component and the maximum spectral coefficient of the digital video signals.

9. A method as in claim 8, wherein the significant portions are additionally formed of a control signal which indicates the magnitude of the output sections.

10. A method as in claim 7, wherein the significant portions are additionally formed of a control signal which indicates the magnitude of the output sections.

11. A method as in claim 5, further comprising the step of securing selected portions of the output sections against transmission and recording errors by securing signals.

12. A method as in claim 7, further comprising the step of securing selected portions of the output sections against transmission and recording errors by securing signals.

13. A method as claim 12, wherein the selected portions of the sections comprise at least one of a direct component, a value of a spectral coefficient and an address of the spectral coefficient.

14. A method as in claim 5, further comprising the step of reconstructing the input sections in their original word lengths after said step of reconstructing the output sections.

15. A method as in claim 1, wherein each output section having a word length greater than the word lengths of the blocks is assigned to a single corresponding one of the blocks, and at least one portion of each output section having a word length greater than the word length of the blocks completely filing at least one corresponding block to which it is assigned.

16. An apparatus for the transmission and/or recording and playback of digital data, comprising:
   one of a data transmission path and a record carrier, having a source side and a sink side;
   means for converting the digital data in sections to digital signals having a word length which is a function of information density in the sections;
   counter means, disposed on said source side, for counting the digital signals;
   a first memory group and a second memory group, each having a plurality of areas, with each area corresponding to a respective block and having a number of memory locations corresponding to a constant block length of the respective blocks;
   first multiplexer means for assigning the digital signals counted by said counter to a corresponding one of the areas of said first memory group and, if the word length of the digital signal is greater than the constant word length of the blocks, to one of the areas of said second memory group, such that only end portions of the digital signals having word lengths greater than the constant word length of the blocks are assigned to the areas of said second memory group;
   first demultiplexer means for combining the digital signals in said first and second memory groups by filling the blocks corresponding to the areas of said first memory group which are assigned digital signals having word lengths which are less than the constant word length of the blocks with the portions of the digital signals in said second memory group;
   first control circuit means for controlling the flow of the digital signals through said counter, said first multiplexer means, said first and second memory groups and said first demultiplexer so that said first demultiplexer means outputs the digital signals to the source side of said one of a data transmission path and a record carrier;
   a decoder having an output and being disposed on said sink side, said decoder having means for evaluating the digital signals at the sink side of said one of a data transmission path and a record carrier;
   a third memory group and a fourth memory group;
   second multiplexer means, connected to said output of said decoder, for assigning the digital signals to said third and fourth memory groups such that the portions of the digital signals previously assigned to area of said first memory group are assigned to corresponding areas of said third memory group of constant block length and portions of the digital signals previously assigned to said second memory group are assigned to corresponding areas of said fourth memory group;
   second demultiplexer means for combining the digital signals in said third and fourth memory groups so as to obtain a flow of the digital data in the order of the input data; and
   second control circuit means for controlling the flow of the digital signals through said decoder, said second multiplexer, said third and fourth memory groups and said second demultiplexer.

17. An apparatus for the transmission and/or recording and playback of digital data, comprising:
   means for converting input data in input sections to digital signals in corresponding output sections having word lengths which are a function of information density in the corresponding input sections;
   means for assigning the output sections of digital signals to blocks having constant word lengths;
   means for filling the blocks assigned to output sections having word lengths that are less that the word lengths of the blocks with portions of the output sections having word lengths which are greater than the word lengths of the blocks;
   means for transmitting the blocks; and
   means for reconstructing the output sections from the blocks, in their original word lengths.

18. An apparatus as in claim 15, further comprising means, downstream of said means for reconstructing the output section, for reconstructing the input sections from the output sections in their original word lengths.

* * * * *